April 3, 1956     C. R. WAYMAN     2,740,486
THREE WHEEL VEHICLE WITH ONE DRIVING WHEEL
AND TWO STEERING WHEELS
Filed Oct. 27, 1951     2 Sheets-Sheet 1

INVENTOR.
CHARLES R. WAYMAN.
BY *Dybvig & Dybvig*
*His Attorneys.*

April 3, 1956     C. R. WAYMAN     2,740,486
THREE WHEEL VEHICLE WITH ONE DRIVING WHEEL
AND TWO STEERING WHEELS
Filed Oct. 27, 1951     2 Sheets-Sheet 2

INVENTOR.
CHARLES R. WAYMAN.
BY Dybvig + Dybvig
His Attorneys.

United States Patent Office 2,740,486
Patented Apr. 3, 1956

2,740,486

THREE WHEEL VEHICLE WITH ONE DRIVING WHEEL AND TWO STEERING WHEELS

Charles R. Wayman, Dayton, Ohio

Application October 27, 1951, Serial No. 253,503

2 Claims. (Cl. 180—25)

This invention relates to a land vehicle and more particularly to a low cost vehicle having only three ground engaging wheels.

The need for a low cost car has been recognized both by the public in general and the automotive industry and numerous efforts have been made from time to time to meet that need, with the result that various makes of small cars have appeared on the market from time to time, but the costs of these small cars have been too prohibitive for wide scale acceptance of the cars. One of the reasons for this is that these cars have all been four wheel cars which have been similar in construction to the larger cars on the market. No successful effort has been made to reduce the number of parts by reducing the number of wheels and otherwise simplifying the construction of the car. It is an object of this invention to simplify and improve the basic design and at the same time improve the stability and performance of the car.

One of the big problems in designing any car is that of providing a car having a good performance, stability and maneuverability. It is an object of this invention to provide a car construction in which only three ground engaging wheels are used and in which the distribution of weight and the steering arrangement combine to improve the over-all operation of the car.

A further object of this invention is to provide a three wheel car in which no two wheels are directly opposite one another and in which two of the wheels turn different amounts relative to the chassis in response to rotation of the steering wheel.

It is another object of this invention to provide an improved steering mechanism including a steering wheel which is adjustable both horizontally and vertically relative to the driver's seat.

Another object of this invention is to provide an improved suspension arrangement for the main car body.

Still another object of this invention is to provide an improved suspension arrangement for the car engine. More particularly, it is an object to provide a self-contained power unit which is readily removable from the chassis as a unit.

A further object of this invention is to provide a chassis which is inexpensive to manufacture yet possesses the necessary strength and the rigidity to withstand the jarring and abuse to which the chassis is subjected.

More particularly, it is an object of this invention to provide a construction wherein it is possible to remove the car body from the chassis with a minimum amount of effort and expense.

Other objects and advantages reside in the construction of parts, the combination thereof and the mode of operation, as will become more apparent from the following description.

Figure 2:
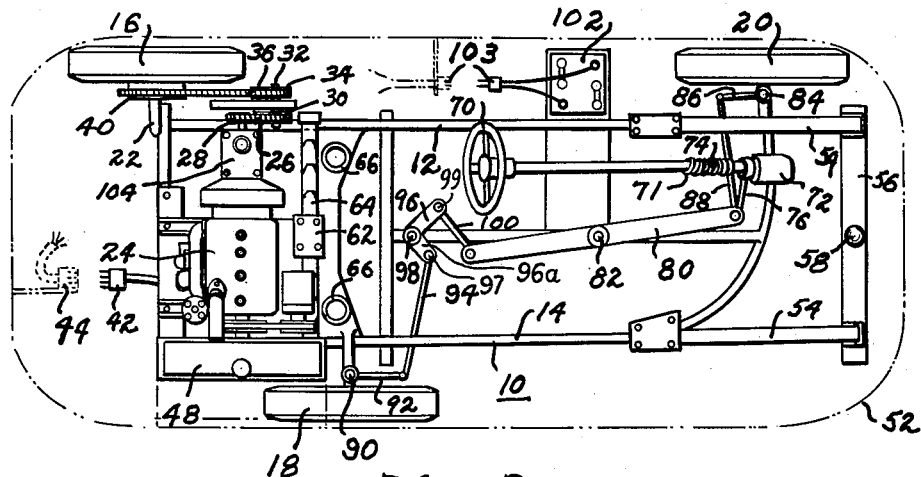
Figure 2 is a plan view of the chassis with parts omitted, so as to illustrate the basic chassis construction.
Figure 1:
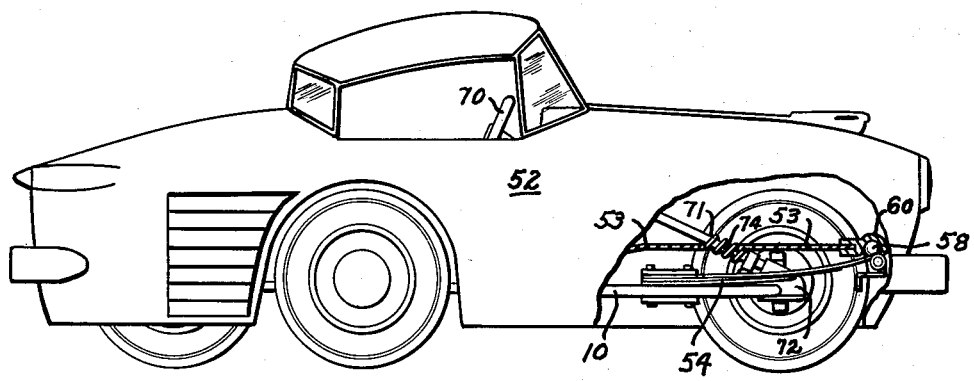
Figure 1 is a side elevational view, somewhat diagrammatic and with parts broken away, showing a preferred embodiment of my invention.
Figure 3:
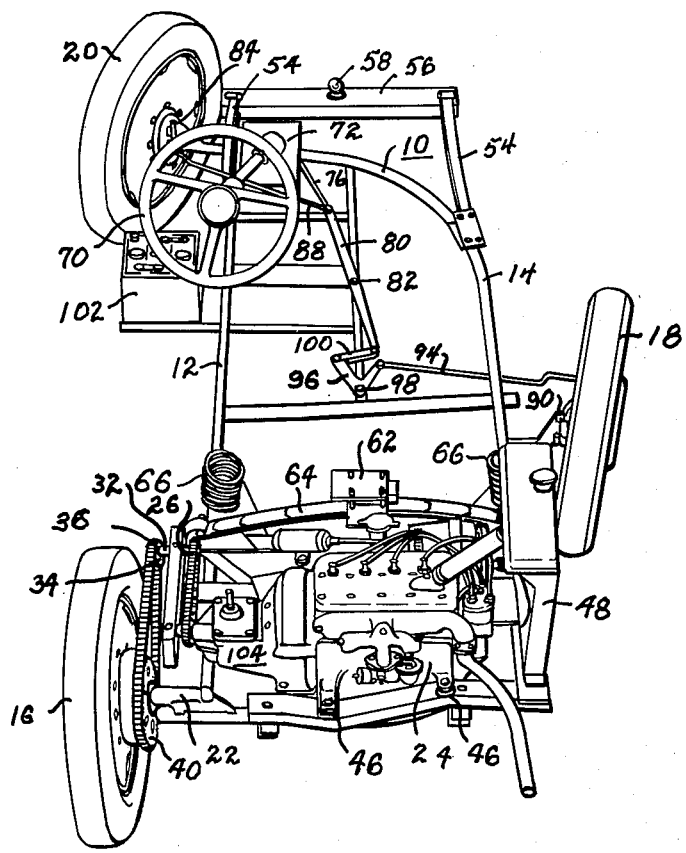
Figure 3 is a perspective view showing the relationship of the engine on the chassis.
Figure 4:
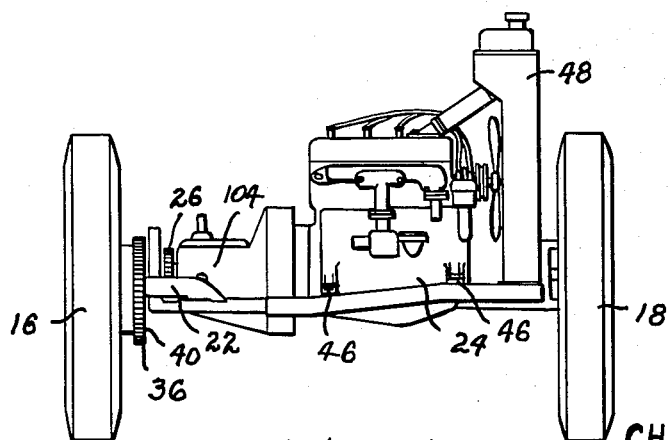
Figure 4 is an end elevational view with parts broken away.

Referring now to the drawing wherein there is shown a preferred embodiment of my invention, reference numeral 10 generally designates the main chassis which consists of a pair of side frames 12 and 14 which extend substantially the full length of the car, as best shown in Figures 1 and 2. Three wheels, which have been designated by the reference numerals 16, 18 and 20, serve to support the chassis 10 the desired distance above the roadway. The rear wheel 16 is a drive wheel which is rotatably supported directly on the chassis 10 by means of a fixed axle 22. The wheels 18 and 20 are mounted for turning movement relative to the main chassis 10, as will be explained more fully hereinafter.

In order to obtain proper traction and load distribution without impairing the steerability of the car, the car engine 24 is mounted adjacent the rear of the chassis at a point substantially between the rear wheel 16 and the intermediate wheel 18 and is adapted to drive the rear wheel 16 through suitable power transmitting mechanism, as shown. The particular type of power transmitting mechanism used may be varied without departing from the spirit of my invention. For purposes of illustration, I have shown a chain drive comprising a first chain 26 which has its one end passing over a sprocket 28 carried by the drive shaft which projects from the gear shift housing 104 of the engine 24, as shown. The chain 26 has its other end passing over a sprocket 30 mounted on a shaft 32 journaled on the chassis 10. The shaft 32 carries a sprocket wheel 34 which cooperates with a chain 36 which in turn passes over the drive sprocket 40 secured to the drive wheel 16.

The main power unit or engine 24 is mounted on the chassis so as to be readily removable therefrom as a unit. To this end all of the electrical connections leading to the engine are connected to a multiple plug 42 which plugs into a power socket 44 carried by the body of the car 52, so that when it is desired to separate the body from the engine for any reason, such as replacement or repair purposes, it is merely necessary to unplug the plug 42 from the socket 44. A plurality of vibration damping mounting members 46 are provided between the car engine and the chassis whereby the engine vibration will not be transmitted to any appreciable extent to the chassis or the car body. The engine radiator 48 is mounted adjacent one side of the car whereby engine cooling air is brought in through an air grill provided in the side wall of the main car body 52, as best shown in Figure 2.

The main car body 52 is floatingly and removably mounted on the chassis in such a manner that it may readily be removed or lifted off the chassis, so as to fully expose the engine for repair, replacement or inspection purposes. As best shown in Figure 2, a pair of leaf springs 54 is provided adjacent the front end of the chassis 10 and serves to support a crossbar 56, which in turn supports a hitching ball 58. This ball serves to engage within a socket 60 secured to the lower front end of the body frame element 53 which constitutes the floor of the car body 52. The ball and socket arrangement just described is of the general type now commonly used in attaching trailers to the bumper of a car and provides a universal connection between the front end of the body 52 and the crossbar 56 which is resiliently carried by the chassis 10.

The rear portion of the body 52 is removably secured to a mounting block 62 which in turn is secured to the midpoint of a transversely extending leaf spring 64 carried by the chassis as shown. It will thus be seen that the main car body is secured to the chassis at two points, both of which lie in a plane passing through the center part of the car body. In order to avoid excessive tilting of the body relative to the chassis and in order to provide for added riding comfort, a pair of coil springs 66 has been provided as shown. The lower ends of these coil springs are mounted directly on the chassis 10 in such a manner that the upper ends engage the bottom surface of the car body adjacent opposite sides of the car body, as best shown in Figure 1.

As a result of the above described mounting arrangement, a modified three point suspension has been provided for the car body. By virtue of the construction shown and by virtue of the fact that no two wheels are mounted directly opposite one another, ordinary bumps encountered on the highway will affect only one wheel at a time and consequently the jarring effect is greatly reduced. When any one of the wheels strikes a bump, this one wheel may be lifted an appreciable distance, but the center of the car body would be lifted only a fraction of this distance.

A steering wheel 70 has been provided as shown and is connected to the steering gear mechanism 72 by means of a universal joint 74, whereby it is possible to raise and lower the steering wheel 70 or move it from side to side without causing the steering mechanism to alter the course of the car. A coil spring 71 surrounds the universal joint and tends to hold the joint straight. Rotation of the wheel 70 causes movement of the steering rod 76 through the mechanism 72 in accordance with well known practice. Movement of the steering rod 76 actuates the lever 80 about its fixed pivot 82, so as to cause turning movement of the wheels 18 and 20. The wheel 20 is provided with the usual pivot pin 84 and steering arm 86. This arm is connected to the rod 88 which transmits power from the lever 80 to the steering arm 86, so as to turn the front wheel 20. The wheel 18 is likewise provided with a pivot pin 90 and a steering arm 92 which has its free end connected to the rod 94, as shown. A bell crank 96 is pivotally supported on the chassis 10 by means of a fixed pivot pin 98. The one arm of the bell crank 96 is pivotally connected by means of a pivot pin 97 to the rod 94 and the other arm is connected by means of a pivot pin 99 to a short link 100 and serves to transmit power from the lever 80 to the bell crank 96. The angle through which the wheel 18 turns with respect to that of the wheel 20 can be made as small as desired by decreasing the length of the arm 96a of the bell crank 96, increasing correspondingly, the length of the rod 94 connected thereto. For the purposes of steering stability, the length of the arm 96a of the bell crank 96 is adjusted so that for any given turn of the wheel 20, the wheel 18 turns a smaller amount than the wheel 20.

The angle between the bell crank arm 96a and the rod 94 lies between 90° and 180°. If the bell crank 96 is rotated in a counterclockwise direction, as viewed in Figure 2, the rod 94 will be pulled toward the center of the car, decreasing the angle between the bell crank arm 96a and rod 94 and deflecting the wheel 18 as for a left turn. If, on the other hand, the bell crank 96 is rotated an equal amount in the opposite, or clockwise, direction, the angle between the bell crank arm 96a and the rod 94 will be increased and the wheel 18 deflected, as for a right turn, but to a lesser extent than for the corresponding left turn. This properly results from the angular relationship between the bell crank arm 96a and the rod 94.

The angular relationships between the lever 80, the link 100, and the bell crank 96 will also affect the turn of the wheel 18 in either direction. However, dominant control is established by the angular relationship between the bell crank 96 and the connecting rod 94.

In order to save wear on the tires and in order to improve the steering of the car, compensation is made for the fact that the wheel 18 travels in a larger arc when traveling on the outside of a turn than when traveling on the inside. Thus, the steering mechanism is compensated so that when making a left turn the wheel 18 will be turned more than when making a correspondingly sharp right turn.

The battery 102 for supplying electricity for operating the engine and for energizing the usual head and tail lights (not shown) is carried by the chassis 10 directly to the rear of the front wheel 20, as best shown in Figure 2. A plug and socket connection 103 is provided between the car body and the chassis, whereby the electrical connections between the two can be made or broken merely by connecting or disconnecting the plug from the socket.

In order to avoid needlessly complicating the disclosure, the conventional gear shift 104 has been shown, which is built onto the engine housing in accordance with well known practice. The gear shift and the mechanism for operating the gear shift have not been shown in detail, as any of the many well known mechanisms for varying the speed ratio between the engine and the wheels may be used without departing from the spirit of my invention.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A steering mechanism for use in a land vehicle having a chassis, a drive wheel suspended therefrom to one side thereof, a first steered wheel and steering arm therefor mounted forward of, and upon a vertical pivot on the opposite side of the vehicle from said drive wheel, a second steered wheel and steering arm therefor mounted forward upon another vertically disposed pivot and on the same side of the vehicle as the drive wheel, said second steered wheel being located near the forward end of the vehicle, said steering mechanism including a steering wheel, a steering shaft rotated by said steering wheel, and arm extending at right angles to said shaft and actuated thereby, a link for directly connecting said last mentioned arm to the steering arm of said second steered wheel, a lever member extending in a general direction parallel to the longitudinal axis of the vehicle, said lever member having its mid point pivotally mounted upon a fixed pivot, one end of said lever being pivotally connected to the end of the arm extending from said shaft, a link pivotally connected to the other end of the lever and forming an obtuse angle therewith, a bell crank pivoted upon a stationary pivot, the arms of said bell crank being pointed towards the lever member and forming angles of approximately 45° with the longitudinal axis of the vehicle when the steered wheels are aligned with the longitudinal axis of the vehicle, one of said bell crank arms being pivotally connected to the last mentioned link, and a link for connecting the other arm of said bell crank to the steering arm of the first mentioned steered wheel.

2. A steering mechanism according to claim 1 wherein the bell crank arm connected by a link to the arm of the steered wheel is shorter than the other arm of the bell crank.

References Cited in the file of this patent

UNITED STATES PATENTS

| | | |
|---|---|---|
| 695,802 | Dirand | Mar. 18, 1902 |
| 1,164,310 | Nilson | Dec. 14, 1915 |

(Other references on following page)

UNITED STATES PATENTS

| | | |
|---|---|---|
| 1,325,277 | Damaizin | Dec. 16, 1919 |
| 1,385,668 | Cunningham | July 26, 1921 |
| 1,656,942 | Drumm Jr. et al. | Jan. 24, 1928 |
| 1,919,170 | Remde | July 18, 1933 |
| 2,233,316 | Klavik | Feb. 25, 1941 |

FOREIGN PATENTS

| | | |
|---|---|---|
| 109,198 | Austria | Mar. 26, 1928 |
| 317,819 | France | Sept. 27, 1902 |
| 482,703 | France | Jan. 23, 1917 |
| 629,871 | Germany | May 14, 1936 |
| 674,249 | Germany | Apr. 11, 1939 |
| 108,732 | Great Britain | Aug. 22, 1917 |
| 346,464 | Great Britain | Apr. 16, 1931 |